United States Patent
Bitar et al.

(10) Patent No.: US 7,739,035 B2
(45) Date of Patent: Jun. 15, 2010

(54) DISTANCE-ESTIMATION METHOD FOR A TRAVELLING OBJECT SUBJECTED TO DYNAMIC PATH CONSTRAINTS

(75) Inventors: Elias Bitar, Toulouse (FR); Nicolas Marty, Castelginest (FR)

(73) Assignee: Thales (FR)

( * ) Notice: Subject to any disclaimer, the term of this patent is extended or adjusted under 35 U.S.C. 154(b) by 512 days.

(21) Appl. No.: 10/573,410

(22) PCT Filed: Sep. 8, 2004

(86) PCT No.: PCT/EP2004/052078

§ 371 (c)(1),
(2), (4) Date: Mar. 27, 2006

(87) PCT Pub. No.: WO2005/031262

PCT Pub. Date: Apr. 7, 2005

(65) Prior Publication Data

US 2007/0031007 A1 Feb. 8, 2007

(30) Foreign Application Priority Data

Sep. 26, 2003 (FR) .................................. 03 11320

(51) Int. Cl.
*G01C 21/00* (2006.01)
*G01C 21/34* (2006.01)
*G08G 9/02* (2006.01)

(52) U.S. Cl. ............................ 701/208; 701/26; 701/28; 701/201; 701/210; 701/301; 701/302; 342/140; 340/995.1; 340/995.19

(58) Field of Classification Search ....................... None
See application file for complete search history.

(56) References Cited

U.S. PATENT DOCUMENTS 4,646,244 A * 2/1987 Bateman et al. ............. 701/301
4,809,348 A * 2/1989 Meyer et al. ................ 382/259

(Continued)

OTHER PUBLICATIONS

Joseph B. Mitchell, "An Algorithmic Approch to Some Problems in Terrain Navigation", Jun. 30, 1986, Oxfor Workshop, pp. 1-30.*

(Continued)

*Primary Examiner*—Jack W. Keith
*Assistant Examiner*—Jonathan M Dager
(74) *Attorney, Agent, or Firm*—Lowe Hauptman Ham & Berner, LLP (57) ABSTRACT

This method allows the calculation, using a terrain elevation database, of a map of the distances of the points accessible to a mobile object subjected to dynamic constraints evolving with its time of travel, for example an aircraft having an imposed vertical flight profile, the distances being measured solely according to paths achievable by the mobile object. It implements a propagation-based distance transform which catalogs the achievable paths going from a goal point whose distance is to be estimated to a source point which is the origin of the distance measurements and likens the distance of the goal point to the length of the shortest achievable path or paths.

10 Claims, 4 Drawing Sheets

U.S. PATENT DOCUMENTS

| | | | | |
|---|---|---|---|---|
| 5,034,992 | A * | 7/1991 | Kumagai | 382/276 |
| 5,305,395 | A * | 4/1994 | Mahoney et al. | 382/205 |
| 5,394,325 | A * | 2/1995 | Schneider, Jr. | 702/18 |
| 5,838,262 | A * | 11/1998 | Kershner et al. | 340/945 |
| 5,839,090 | A * | 11/1998 | Zoraster | 702/5 |
| 5,892,462 | A * | 4/1999 | Tran | 340/961 |
| 6,084,989 | A * | 7/2000 | Eppler | 382/293 |
| 6,177,943 | B1 * | 1/2001 | Margolin | 345/419 |
| 6,480,120 | B1 * | 11/2002 | Meunier | 340/970 |
| 6,563,509 | B1 * | 5/2003 | Harris | 345/592 |
| 6,707,394 | B2 * | 3/2004 | Ishihara et al. | 340/970 |
| 6,748,325 | B1 * | 6/2004 | Fujisaki | 701/301 |
| 6,750,815 | B2 * | 6/2004 | Michaelson et al. | 342/357.13 |
| 7,098,809 | B2 * | 8/2006 | Feyereisen et al. | 340/963 |
| 2003/0122701 | A1 * | 7/2003 | Tran | 342/29 |
| 2003/0202697 | A1 * | 10/2003 | Simard et al. | 382/195 |
| 2004/0239529 | A1 * | 12/2004 | Tran | 340/961 |
| 2006/0059497 | A1 | 3/2006 | Lericeh et al. | |
| 2008/0122858 | A1 * | 5/2008 | Wilensky | 345/592 |

OTHER PUBLICATIONS

Horng J-H et al: "Vehicle path planning by use adaptive constrained distance transformation" Pattern Recognition, Pergamon Press Inc. Elmsford, N.Y., US vol. 35, No. 6, Jun. 2002, pp. 1327-1337.

Stiles P et al: "Route Planning" Proceedings of the Digital Avionics Systems Conference. Los Angeles, Oct. 14-17, 1991, New York, IEEE, US, vol. Conf. 10, Oct. 14, 1991 pp. 420-425.

* cited by examiner

DISTANCE-ESTIMATION METHOD FOR A TRAVELLING OBJECT SUBJECTED TO DYNAMIC PATH CONSTRAINTS

BACKGROUND OF THE INVENTION

1. Field of the Invention

The invention relates to terrain navigation in respect of a mobile object subject to travel constraints varying over time, such as an aircraft limited in terms of rate of climb, the limit possibly being negative, and deploying above a terrain zone exhibiting threatening obstacles or reliefs close to or above its flight altitude.

2. Description of the Related Art

Diverse systems have been developed for forewarning the crew of an aircraft of a risk of collision with the ground. Some, such as the TAWS systems (the acronym standing for "Terrain Awareness and Warning System"), make a short-term trajectory forecast for the aircraft on the basis of flight information (position, heading, orientation and amplitude of the speed vector) provided by the onboard equipment, situate this forecast with respect to a map of the region overflown extracted from a terrain elevation database accessible on board and emit alarms destined for the crew of the aircraft whenever the short-term forecastable trajectory comes into collision with the ground. These TAWS systems supplement their alarms with rudimentary recommendations of the kind "Terrain Ahead, Pull up". Some of them also give information about the level of risk of collision incurred due to the reliefs and the obstacles surrounding the aircraft in the form of a map presenting the reliefs or the obstacles of the terrain overflown as strata of different colors. However, this map of risks of collision with the environment takes account only of the altitudes of the relief relative to the position of the mobile object and does not take account of the existence or otherwise of a realistic trajectory making it possible to join up with the zones displayed.

To satisfy this requirement of ascertaining the points of the terrain overflown that remain accessible after a maneuver for avoiding a relief or an obstacle on the ground, the map of risk of collision with the environment must display only the zones for which there is a possible route from the current position of the mobile object. The realization of such a display involves the association of a metric with a relief map derived from a terrain elevation database.

A known procedure for associating a metric with a relief map derived from a terrain elevation database with regular meshing of the terrestrial surface or of a part of the latter, consists in considering the map presenting the relief on the basis of altitude values appearing, with the geographical coordinates, latitude and longitude of the measurement points, in the elements of the terrain elevation database as an image whose pixels are the altitude values of the points of the terrain elevation database that are illustrated in the map with, as abscissa and ordinate coordinates within the image, the latitude and longitude geographical coordinates of these points appearing in the elements of the terrain elevation database and in calling upon a distance transform operating by propagation to estimate distances within this image.

Distance transforms operating by propagation also known as "chamfer distance transforms" or "chamfer Euclidean distance transforms" deduce the distance of a pixel termed the goal pixel with respect to another pixel termed the source pixel, from the distances previously estimated for the pixels of its neighborhood, through a scan of the pixels of the image. The scan makes it possible to estimate the distance of a new goal pixel with respect to the source pixel by searching for the path of minimum length going from the new goal pixel to the source pixel passing through an intermediate pixel of its neighborhood whose distance has already been estimated, the distance of the new goal pixel to an intermediate pixel of its neighborhood whose distance has already been estimated being given by applying a neighborhood mask commonly called a chamfer mask.

A distance transform of this kind was proposed in 1986 by Gunilla Borgefors for estimating distances between objects in a digital image, in an article entitled: "Distance Transformation in Digital Images" and published in the journal "Computer Vision, Graphics and Image Processing", Vol. 34 pp. 344-378. One of the interesting benefits of these propagation-based distance transforms is of reducing the complexity of the calculations of a distance estimate by permitting the use of integers.

To select the path of minimum length giving the distance estimate, a propagation-based distance transform must test all the possible paths. This obligation is manifested as a regularity constraint imposed on the order of scanning of the pixels of an image. G. Borgefors proposes, in order to satisfy this regularity constraint, that the pixels of an image be scanned twice consecutively, in two mutually inverse orders, which are either lexicographic order, the image being analyzed from left to right row by row and from top to bottom, and inverse lexicographic order, or transposed lexicographic order, the image having undergone a 90° rotation, and inverse transposed lexicographic order. She also proposes the adoption of a chamfer mask of dimensions 3×3 with two values (3, 4) of neighborhood distances or of dimensions 5×5 with three values (5, 7, 11) of neighborhood distances.

Distance transforms operating by propagation are already employed in the field of terrain navigation for robots. In this context, it is known to use the distance transform of G. Borgefors with a static constraint consisting in routinely allocating an infinite distance to a point under analysis when it is apparent that it belongs to reliefs or obstacles to be circumvented that are cataloged in a memory of prohibited crossing zones, so as to eliminate, from the set of the paths tested during a distance estimation, those passing through the reliefs or obstacles that the robot must circumvent. However, a distance transform operating by propagation used with a static constraint within the context of terrain navigation for robots, is not suitable for terrain navigation for aircraft for which the threat presented by a relief or an obstacle on the ground depends on the vertical profile of its trajectory.

SUMMARY OF THE INVENTION

It is an object of this invention to provide a method of estimating the distances of the points of a map extracted from a terrain elevation database with respect to a reference point employing a distance transform operating by propagation, with a dynamic constraint changing over time suitable for terrain navigation for an aircraft having a trajectory with imposed vertical profile.

Briefly stated, the present invention is directed to a method of estimating the distances of the points of a map extracted from a terrain elevation database, for a mobile object subjected to dynamic constraints prohibiting it from certain zones of the map referred to as prohibited zones of passage whose configuration varies as a function of the time of travel of the mobile object. The terrain elevation database encompasses a set of points labeled by an altitude, a latitude and a longitude meshing the terrain of deployment of the mobile object. The method implements a distance transform operating by propagation over the image constituted by the elements of the terrain elevation database corresponding to the map and arranged in rows and columns in orders of values of longitude and latitude. This distance transform estimates the distances of the various points of the image with respect to a source point placed in proximity to the mobile object, by applying, by scanning, a chamfer mask to the various points of the image. The estimation of distance of a point, by application of the chamfer mask to this point termed the goal point is performed by cataloging the various paths going from the goal point to the source point and passing through points of the neighborhood of the goal point which are covered by the chamfer mask and whose distances from the source point have been estimated previously in the course of the same scan, by determining the lengths of the various paths cataloged by summation of the distance assigned to the point of passage of the neighborhood and of its distance from the goal point, extracted from the chamfer mask, by searching for the shortest path among the paths cataloged and by adopting its length as estimate of the distance of the goal point. Initially, at the start of the scan, a distance value greater than the largest distance measurable on the image allocated to all the points of the image except for the source point, origin of the distance measurements, to which is assigned a zero distance value. The method is noteworthy in that the lengths of the paths cataloged, during the application of the chamfer mask to a goal point, with a view to searching for the shortest path, are translated into times of travel for the mobile object and in that the cataloged paths whose times of travel for the mobile object are such that the goal point would belong to a prohibited zone of passage at the moment at which the mobile object reached it, are excluded from the search for the shortest path.

Advantageously, when the mobile object is an aircraft having a vertical flight profile to be complied with determining the evolution of its instantaneous altitude, there are associated, with the lengths of the cataloged paths, the forecastable values of the instantaneous altitudes that the aircraft would have by reaching the goal point via these paths while complying with the vertical flight profile imposed, and the cataloged paths associated with forecastable values of altitude that are less than or equal to the goal point altitude given by the terrain elevation database and increased by a protection margin are eliminated from the search for the shortest path.

Advantageously, when the mobile object is an aircraft having an imposed vertical flight profile, the distance estimation operated by propagation over the image constituted from the elements of the terrain elevation database corresponding to the map is doubled up with an estimation of the forecastable altitude of the aircraft in line with the various points of the image by assuming that it follows the shortest path selected for the distance estimation and that it complies with the vertical flight profile imposed.

Advantageously, when the mobile object is an aircraft with imposed vertical flight profile and when the distance estimate is doubled up with an estimate of the forecastable altitude of the aircraft, the altitudes of the various points of the map are subtracted from the estimates of the forecastable altitudes of the aircraft at these points to obtain deviations with respect to the ground.

Advantageously, when the mobile object is an aircraft with imposed vertical flight profile and when the distance estimate is doubled up with an estimate of the forecastable altitude of the aircraft, the altitudes of the various points of the map are subtracted from the estimates of the forecastable altitudes of the aircraft at these points to obtain deviations with respect to the ground displayed on the map as color strata.

Advantageously, the propagation-based distance transform scans the pixels of the image constituted from the elements of the terrain elevation database corresponding to the map, in several successive passes according to different orders.

Advantageously, the propagation-based distance transform scans the pixels of the image constituted from the elements of the terrain elevation database belonging to the map, in several successive passes according to different orders and repeatedly until the distance estimates obtained stabilize.

Advantageously, the propagation-based distance transform scans the pixels of the image constituted from the elements of the terrain elevation database corresponding to the map, in several successive passes according to different orders including lexicographic order, inverse lexicographic order, transposed lexicographic order and inverse transposed lexicographic order.

Advantageously, the propagation-based distance transform scans the pixels of the image constituted from the elements of the terrain elevation database corresponding to the map, in a series of four passes that is repeated until stabilization of the distance estimates:
  a first pass performed row by row from top to bottom of the image, each row being traversed from left to right,
  a second pass performed row by row from bottom to top of the image, each row being traversed from right to left,
  a third pass performed column by column from left to right of the image, each column being traversed from top to bottom, and
  a fourth pass performed column by column from right to left of the image, each column being traversed from bottom to top.

Advantageously, the propagation-based distance transform scans the pixels of the image constituted from the elements of the terrain elevation database corresponding to the map, in a series of eight passes that is repeated until stabilization of the distance estimates:
  a first pass performed row by row from top to bottom of the image, each row being traversed from left to right,
  a second pass performed row by row from bottom to top of the image, each row being traversed from right to left,
  a third pass performed column by column from left to right of the image, each column being traversed from top to bottom,
  a fourth pass performed column by column from right to left of the image, each column being traversed from bottom to top,
  a fifth pass performed row by row from top to bottom of the image, each row being traversed from right to left,
  a sixth pass performed row by row from bottom to top of the image, each row being traversed from left to right,
  a seventh pass performed column by column from right to left of the image, each column being traversed from top to bottom, and
  an eighth pass performed column by column from left to right of the image, each column being traversed from bottom to top.

BRIEF DESCRIPTION OF THE DRAWINGS

Other characteristics and advantages of the invention will emerge from the description hereinbelow of an embodiment given by way of example. This description will be offered in conjunction with the drawing in which:
  a FIG. 1 represents an exemplary chamfer mask,
  FIGS. 2a and 2b show the cells of the chamfer mask illustrated in FIG. 1, which are used in a scanning pass according to lexicographic order and in a scanning pass according to inverse lexicographic order, a FIG. 3 is a chart illustrating the main steps of a method, in accordance with the invention, for estimating the distance of a point having regard to a dynamic constraint in the course of the application of a chamfer mask, a FIG. 4 is a chart illustrating a variant of the method of estimating the distance of a point shown in FIG. 3, and a FIG. 5 is a chart of the main steps of a method, in accordance with the invention, for estimating, by propagation, the distances of the set of the points of a map taking account of a dynamic constraint and implementing a method of estimating the distance of a point such as those shown in FIGS. 3 and 4.

DETAILED DESCRIPTION OF THE EMBODIMENTS

The distance between two points of a surface is the minimum length of all the possible routes over the surface starting from one of the points and finishing at the other. In an image formed of pixels distributed according to a regular mesh of rows, columns and diagonals, a propagation-based distance transform estimates the distance of a pixel termed "goal" pixel with respect to a pixel termed "source" pixel by constructing progressively, starting from the source pixel, the shortest possible path following the mesh of pixels and finishing at the goal pixel, being aided by the distances found for the image pixels already analyzed and an array termed a chamfer mask cataloging the values of the distances between a pixel and its close neighbors.

Figure 1:
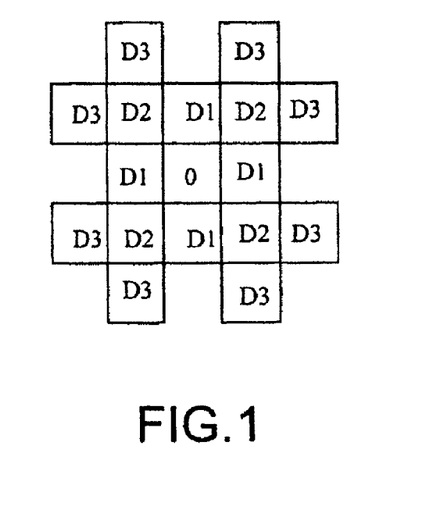

As shown in FIG. 1, a chamfer mask takes the form of an array with an arrangement of boxes reproducing the pattern of a pixel surrounded by its close neighbors. At the center of the pattern, a box assigned the value labels the pixel taken as origin of the distances cataloged in the array. Around this central box are clustered peripheral boxes filled with non-zero distance values and mimicking the arrangement of the pixels of the neighborhood of a pixel assumed to occupy the central box. The distance value appearing in a peripheral box is that of the distance separating a pixel occupying the position of the peripheral box concerned, from a pixel occupying the position of the central box. It is noted that the distance values are distributed as concentric circles. A first circle of four boxes corresponding to the four pixels closest to the pixel of the central box that are placed either on the row or on the column of the pixel of the central box are assigned a distance value D1. A second circle of four boxes corresponding to the four pixels closest to the pixel of the central box that are placed outside the row and column of the pixel of the central box are assigned a distance value D2. A third circle of eight boxes corresponding to the eight pixels closest to the pixel of the central box that are placed outside the row, the column and the diagonals of the pixel of the central box are assigned a value D3.

The chamfer mask can cover a neighborhood of greater or lesser extent of the pixel of the central box by cataloging the values of the distances of a greater or lesser number of concentric circles of pixels of the neighborhood. It may be reduced to the first two circles formed by the pixels of the neighborhood of a pixel occupying the central box or be extended beyond the first three circles formed by the pixels of the neighborhood of the pixel of the central box but it is customary to stop at first three circles like that represented in FIG. 1. The values of the distances D1, D2, D3 which correspond to Euclidian distances are expressed in a scale permitting the use of integers at the cost of a certain approximation. Thus, G. Borgefors gives the value 5 to the distance d1 corresponding to an echelon with abscissa x or with ordinate y, the value 7, which is an approximation of $5\sqrt{2}$, to the distance d2 corresponding to the root of the sum of the squares of the echelons with abscissa and ordinate $\sqrt{x^2+y^2}$, and the value 11, which is an approximation of $5\sqrt{5}$, to the distance d3.

The progressive construction of the shortest possible path going to a goal pixel, starting from a source pixel and following the mesh of pixels is done by regular scanning of the pixels of the image by means of the chamfer mask. Initially, the pixels of the image are assigned an infinite distance value, in fact a number high enough to exceed all the values of the distances measurable in the image, with the exception of the source pixel which is assigned a zero distance value. Then the initial distance values assigned to the goal points are updated in the course of the scan of the image by the chamfer mask, an update consisting in replacing a distance value allocated to a goal point with a new lesser value resulting from a distance estimate made on the occasion of a new application of the chamfer mask to the goal point considered.

An estimation of distance by application of the chamfer mask to a goal pixel consists in cataloging all the paths going from this goal pixel to the source pixel and passing through a pixel of the neighborhood of the goal pixel whose distance has already been estimated in the course of the same scan, in searching from among the paths cataloged, for the shortest path or paths and in adopting the length of the shortest path or paths as distance estimate. This is done by placing the goal pixel whose distance it is desired to estimate in the central box of the chamfer mask, while selecting the peripheral boxes of the chamfer mask corresponding to pixels of the neighborhood whose distance has just been updated, while calculating the lengths of the shortest paths connecting the pixel to be updated to the source pixel while passing through one of the selected pixels of the neighborhood, by addition of the distance value assigned to the pixel of the neighborhood concerned and of the distance value given by the chamfer mask, and in adopting, as distance estimate, the minimum of the path length values obtained and of the old distance value assigned to the pixel undergoing analysis.

The order of scanning of the pixels of the image influences the reliability of the distance estimates and of their updates since the paths taken into account depend thereon. In fact, it is subject to a regularity constraint which implies that if the pixels of the image are labeled in lexicographic order (pixels ranked in row-by-row ascending order starting from the top of the image and progressing toward the bottom of the image, and from left to right within a row), and if a pixel p has been analyzed before a pixel q then a pixel p+x must be analyzed before the pixel q+x. The lexicographic order (scanning of the pixels of the image row-by-row from top to bottom, and within a row, from left to right), inverse lexicographic order (scanning of the pixels of the image row-by-row from bottom to top and, within a row, from right to left), transposed lexicographic order (scanning of the pixels of the image column-by-column from left to right and, within a column, from top to bottom), inverse transposed lexicographic order (scanning of the pixels by columns from right to left and within a column from bottom to top) satisfy this regularity condition and more generally all scans in which the rows and columns, or the diagonals are scanned from right to left or from left to right. G. Borgefors advocates a double scan of the pixels of the image, once in lexicographic order and another time in inverse lexicographic order.

Figure 2A:
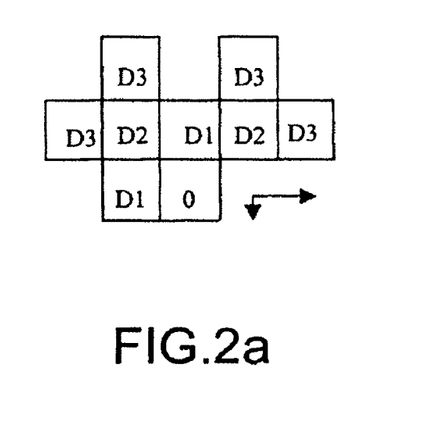

FIG. 2a shows, in the case of a scan pass in lexicographic order going from the upper left corner to the lower right corner of the image, the boxes of the chamfer mask of FIG. 1 that are used to catalog the paths going from a goal pixel placed on the central box (box indexed by 0) to the source pixel, passing through a pixel of the neighborhood whose distance has already formed the subject of an estimate in the course of the same scan. These boxes are eight in number, arranged in the upper left part of the chamfer mask. There are therefore eight paths cataloged for the search for the shortest whose length is taken as estimate of the distance.

Figure 2B:
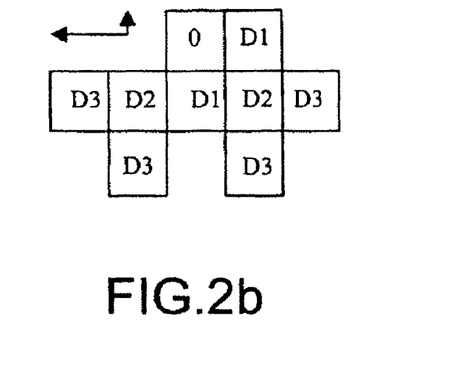

FIG. 2b shows, in the case of a scan pass in inverse lexicographic order going from the lower right corner to the upper left corner of the image, the boxes of the chamfer mask of FIG. 1 that are used to catalog the paths going from a goal pixel placed on the central box (box indexed by 0) to the source pixel, passing through a pixel of the neighborhood whose distance has already formed the subject of an estimate in the course of the same scan. These boxes are complementary to those of FIG. 2a. They are also eight in number but arranged in the lower right part of the chamfer mask. There are therefore eight paths cataloged for the search for the shortest whose length is taken as estimate of the distance.

The propagation-based distance transform whose principle has just been recalled briefly was designed originally for the analysis of the positioning of objects in an image but it was soon applied to the estimation of the distances on a relief map extracted from a terrain elevation database with regular meshing of the terrestrial surface. Specifically, such a map is not furnished explicitly with a metric since it is plotted on the basis of the altitudes of the points of the mesh of the terrain elevation database of the zone represented. In this context, the propagation-based distance transform is applied to an image whose pixels are the elements of the terrain elevation database belonging to the map, that is to say, altitude values associated with the latitude, longitude geographical coordinates of the nodes of the mesh where they have been measured, ranked, as on the map, by increasing or decreasing latitude and longitude according to an array with two coordinate dimensions, latitude and longitude.

For terrain navigation of mobile objects such as robots, the propagation-based distance transform is used to estimate the distances of the points of the changing terrain map extracted from a database of elevation of the terrain with respect to the position of the mobile object or a close position. In this case, it is known to take account of static constraints consisting of map zones that the mobile object cannot cross on account of their undulating configurations. Hence, a prohibited-zone marker is associated with the elements of the terrain elevation database appearing in the map. It signals, when it is activated, an uncrossable or prohibited zone and blocks any updating other than initialization, of the distance estimate made by the propagation-based distance transform in respect of the pixel element considered.

In the case of an aircraft, the uncrossable zones change as a function of the vertical profile imposed on its trajectory so that a distance estimate under static constraints by means of a propagation-based distance transform is not satisfactory.

It is proposed that account be taken, in the definition of the prohibited zones of passage, of the forecastable altitude of the aircraft at each goal point whose distance is currently being estimated. This forecastable altitude, which quite obviously depends on the path followed, is that of the aircraft after negotiating the path adopted for the distance measurement. The estimate of this forecastable altitude of the aircraft at a goal point is done by propagation in the course of the scan of the image by the chamfer mask in a manner similar to the distance estimation. For each path cataloged going from a goal point to the source point, passing through a point of the neighborhood of the goal point, of which the distance to the source point and the forecastable altitude of the aircraft have already been estimated in the course of the same scan, the forecastable altitude of the aircraft is deduced from the length of the path and the vertical profile imposed on the trajectory of the aircraft. This forecastable altitude, estimated for each path cataloged going from a goal point whose distance is currently being estimated to a source point placed in proximity to the position of the aircraft, is used as a criterion for selecting the paths taken into account in the distance estimation. If it is less than or equal to the altitude of the goal point appearing in the terrain elevation database plus a safety margin, the cataloged path with which it is associated is discarded and does not participate in the selection of the shortest path. Once the selection of the shortest path has been made, its length is taken as distance of the goal point and the forecastable altitude of the aircraft which is associated therewith is also retained as the altitude of the aircraft at the goal point.

Figure 3:
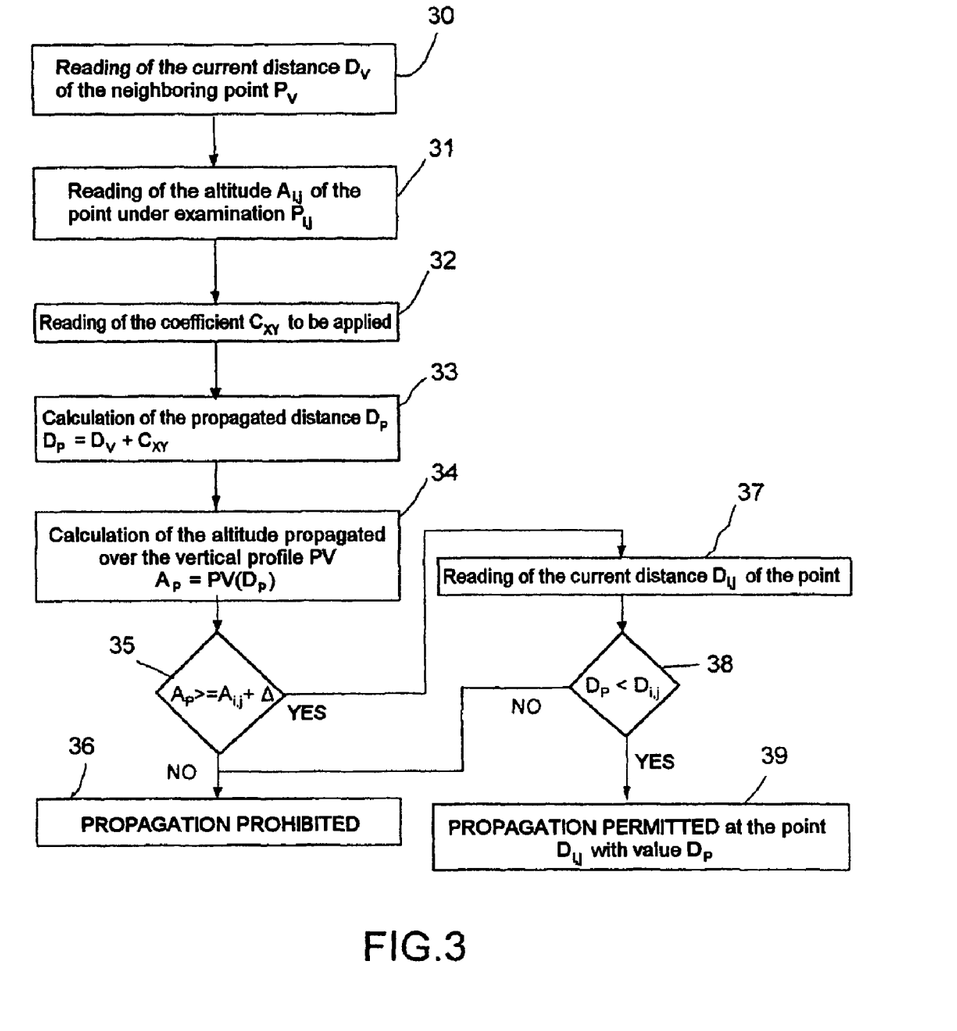

FIG. 3 illustrates the main steps of the processing performed during the application of the chamfer mask to a goal point $P_{i,j}$ to estimate its distance in respect of an aircraft having an imposed vertical trajectory profile. The goal point considered $P_{i,j}$ is placed in the central box of the chamfer mask. For each neighboring point $P_V$ which enters the boxes of the chamfer mask and whose distance has already been estimated in the course of the same scan, the processing consists in:

reading the estimated distance $D_V$ of the neighboring point $P_V$ (step 30), reading the altitude $A_{i,j}$ of the goal point $P_{i,j}$ in the terrain elevation database (step 31), reading the coefficient $C_{XY}$ of the chamfer mask corresponding to the box occupied by the neighboring point $P_V$ (step 32), calculating the propagated distance $D_P$ corresponding to the sum of the estimated distance $D_V$ of the neighboring point $P_V$ and of the coefficient $C_{XY}$ assigned to the chamfer mask box occupied by the neighboring point $P_V$:

$$D_P = D_V + C_{XY}$$

(step 33), calculating the forecastable altitude $A_P$ of the aircraft after crossing of the distance $D_P$ directly from the distance $D_P$ if the vertical profile imposed on the trajectory of the aircraft is defined as a function of the distance traveled $PV(D_P)$ and takes implicitly into account the time of travel or indirectly by way of the time of travel if the vertical profile imposed on the trajectory of the aircraft is defined by a rate of change of altitude (step 34), comparing the forecastable altitude $A_P$ obtained with that $A_{i,j}$ of the goal point $P_{i,j}$ as derived from the terrain elevation database increased by a safety margin $\Delta$ (step 35), eliminating the propagated distance $D_P$ if the forecastable altitude $A_P$ is less than or equal to that $A_{i,j}$ of the goal point $P_{i,j}$ as derived from the terrain elevation database and augmented by the safety margin $\Delta$ (step 36), if the forecastable altitude $A_P$ is greater than that $A_{i,j}$ of the goal point augmented by the safety margin $\Delta$, reading the distance $D_{i,j}$ already assigned to the goal point considered $P_{i,j}$ (step 37) and comparing it with the propagated distance $D_P$ (step 38), eliminating the propagated distance $D_P$ if it is greater than or equal to the distance $D_{i,j}$ already assigned to the goal point considered $P_{i,j}$ and replacing the distance $D_{i,j}$ already assigned to the goal point considered $P_{i,j}$ by the propagated distance $D_P$ if the latter is less (step 39).

Figure 4:
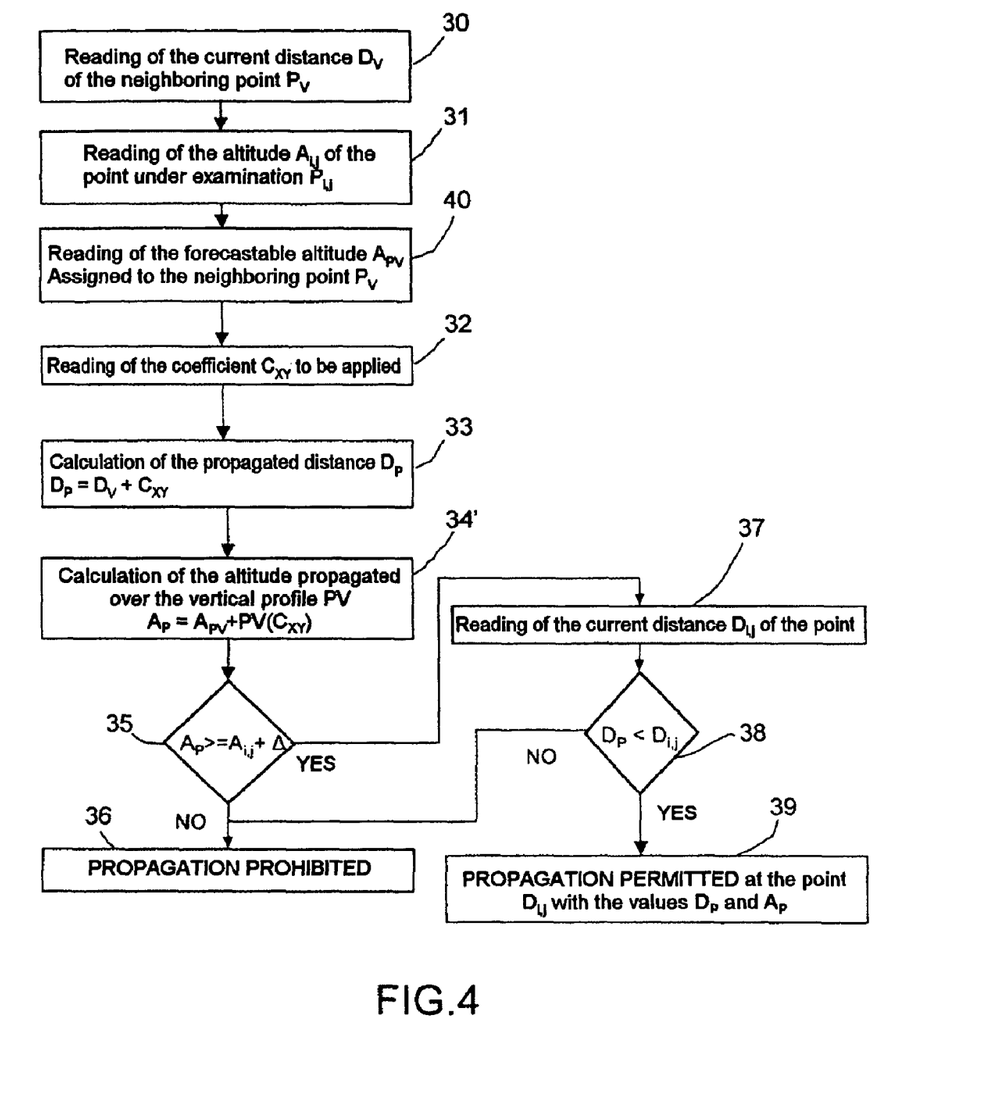

FIG. 4 illustrates the main steps of a variant of the processing performed during the application of the chamfer mask to a goal point $P_{i,j}$ to estimate its distance in respect of an aircraft having an imposed vertical trajectory profile.

This variant differs in the manner of formulating the forecastable altitude $A_P$ of the aircraft. It assumes that the forecastable altitude of the aircraft at each point of the terrain elevation database calculated as a function of the vertical profile imposed on its trajectory and on the basis of the length of the path selected for the distance measurement is not considered as a fleeting variable, thereby allowing the processing described in relation to FIG. 3, but is stored, in the same guise as the distance estimate. In this variant, steps 30, 31 of reading the estimated distance $D_V$ of the neighboring point $P_V$ and of the altitude $A_{i,j}$ of the goal point $P_{i,j}$ in the terrain elevation database are supplemented with a step 40 of reading the forecastable altitude $A_{PV}$ of the aircraft at the neighboring point $P_V$, and the calculation of the forecastable altitude $A_P$ is done (step 34') by summation of the forecastable altitude $A_{PV}$ at the neighboring point $P_V$ and of the variation of altitude over the distance separating the neighboring point $P_V$ from the goal point due to the vertical profile imposed on the trajectory of the aircraft.

The storage of the forecastable altitudes of the aircraft when the latter reaches the various points of the map which are accessible by it makes it possible to establish, by subtracting therefrom the altitudes of the points of the map as derived from the terrain elevation database, a map of the maximum possibilities of overfly heights of the aircraft representing the forecastable deviations with respect to the terrain as color strata. Such a map helps the crew of the aircraft to choose a realistic trajectory exhibiting the best ground clearance.

As indicated previously, the estimation of the distances of the various points of the map is done by applying a processing by chamfer mask such as those just described in relation to FIGS. 3 and 4, to the whole set of pixels of the image formed by the elements of the terrain elevation database belonging to the map, taken successively according to a regular scan comprising a minimum of two passes carried out in inverse orders.

Figure 5:
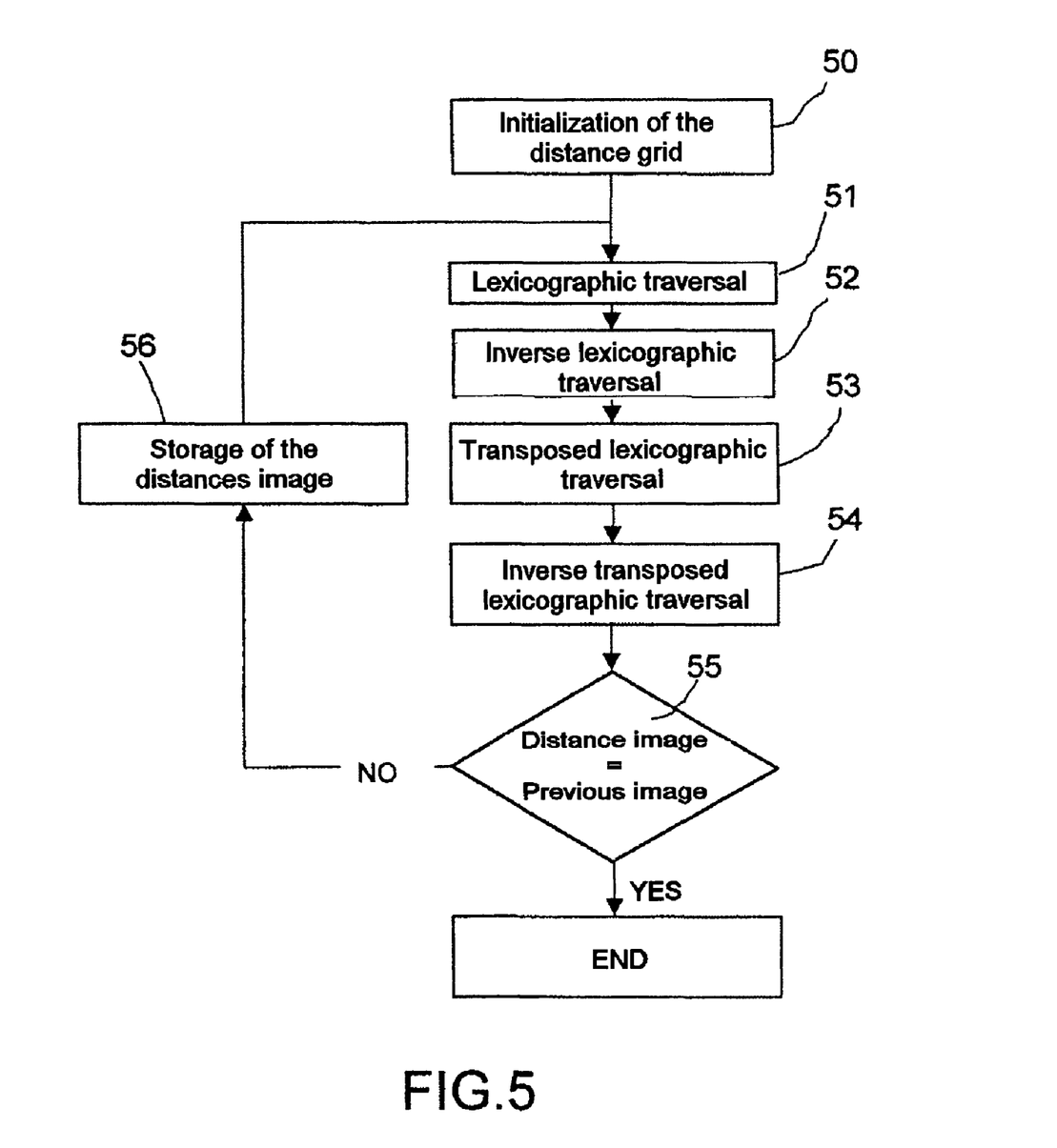

FIG. 5 illustrates the main steps of an exemplary global process allowing the estimation of the distances of the set of points of a relief map for a mobile object subject to dynamic constraints.

The first step 50 of the process is an initialization of the distances assigned to the various points of the map that are considered as the pixels of an image. This initialization of the distances consists, as indicated previously, in allocating an infinite distance value, at the very least greater than the largest distance measurable on the map, for all the points of the map that are considered as goal points, with the exception of a single one considered as the source of all the distances and to which a zero distance value is allocated. This source point is chosen in proximity to the instantaneous position of the mobile object on the map.

The subsequent steps 51 to 54 are passes of a regular scan, in the course of which passes the chamfer mask is applied successively and repeatedly to all the points of the map that are considered as the pixels of an image, the application of the chamfer mask to a point of the map giving an estimate of the distance of this point with respect to the source point, by execution of one of the process operations described in relation to FIG. 3 or FIG. 4.

The first scan pass (step 51) is done in lexicographic order, the pixels of the image being analyzed row by row from top to bottom of the image and from left to right within one and the same row. The second scan pass (step 52) is done in inverse lexicographic order, the pixels of the image still being analyzed row by row but from bottom to top of the image and from right to left within a row. The third scan pass (step 53) is done in transposed lexicographic order, the pixels of the image being analyzed column by column from the left to the right of the image and from top to bottom within one and the same column. The fourth scan pass (step 54) is done in inverse transposed lexicographic order, the pixels of the image being analyzed column by column but from right to left of the image and from bottom to top within one and the same column.

These four passes (steps 51 to 54) are repeated as long as the distance image obtained changes. To do this, the distance image content obtained is stored (step 56) after each series of four passes (steps 51 to 54) and compared with the distance image content obtained in the previous series (step 55), the loop being broken only when the comparison shows that the content of the distance image no longer varies.

In theory, two scan passes in lexicographic order and inverse lexicographic order may suffice. However, the presence of prohibited zones of passage of concave shape may cause, in the distances propagation phenomenon, dead angles enclosing pixels, for which the application of the chamfer mask does not give any distance estimate. To reduce this risk of dead angle, it is advisable to vary the direction of the distance propagation phenomenon by varying the direction of the scan, hence the doubling of the passes with a transposition of the orders of scan corresponding to a 90° rotation of the image. For a yet better elimination of the dead angles, it is possible to undertake series of eight passes:

a first pass performed row by row from top to bottom of the image, each row being traversed from left to right, a second pass performed row by row from bottom to top of the image, each row being traversed from right to left, a third pass performed column by column from left to right of the image, each column being traversed from top to bottom, a fourth pass performed column by column from right to left of the image, each column being traversed from bottom to top, a fifth pass performed row by row from top to bottom of the image, each row being traversed from right to left, a sixth pass performed row by row from bottom to top of the image, each row being traversed from left to right, a seventh pass performed column by column from right to left of the image, each column being traversed from top to bottom, and an eighth pass performed column by column from left to right of the image, each column being traversed from bottom to top.

It is possible to introduce into the series of scan passes other types of scan passes deduced from the previous passes by making the diagonals of the image play the roles previously played by the rows and columns of the image. This amounts to applying the scan passes described previously to an image rotated by 45°. In a general manner, the more the passes of a series are varied the more the risk of dead angle decreases.

The invention claimed is:

1. A method for estimating the distances from a mobile object, to the points of a map of a terrain over which the mobile object is moving;

said mobile object being subjected to dynamic constraints prohibiting it from certain zones of the map, referred to as prohibited zones of passage, whose configuration varies as a function of the time of travel of the mobile object;

said map being extracted from a terrain elevation database, encompassing a set of points labeled by an altitude, a latitude and a longitude meshing the terrain of deployment of the mobile object;

said method implementing a distance transform operating by propagation over the image constituted by the elements of the terrain elevation database corresponding to the map and arranged in rows and columns in orders of values of longitude and latitude;

the distance transform estimating the distances of the various points of the image with respect to a source point placed in proximity to the mobile object, by applying, by scanning, a chamfer mask to the various points of the image;

the estimation of distance of a point, by application of the chamfer mask to this point termed the goal point being performed in the distance transform by cataloguing the various paths going from the goal point to the source point and passing through points of the neighborhood of the goal point which are covered by the chamfer mask and whose distances from the source point have been estimated previously in the course of the same scan, by determining the lengths of the various paths catalogued by summation of the distance assigned to the point of passage of the neighborhood and of its distance from the goal point, extracted from the chamfer mask, by searching for the shortest path among the paths cataloged and by adopting its length as estimate of the distance of the goal point; a distance value greater than the largest distance measurable on the image being initially allocated, at the start of the scan, to all the points of the image except to the source point, origin of the distance measurements, to which is assigned a zero distance value;

in said method the paths catalogued during the application of the chamfer mask to a goal point with a view to searching for the shortest path, have their lengths translated into times of travel for the mobile object and those catalogued paths whose times of travel for the mobile object are such that the goal point would belong to a prohibited zone of passage at the moment at which the mobile object reached it, are excluded from the search for the shortest path, and wherein further said method is applied to an aircraft having a vertical flight profile to be complied with determining the evolution of its instantaneous altitude, wherein the lengths of the paths catalogued during the application of the chamfer mask to a goal point, are associated with the forecastable values of the instantaneous altitudes that the aircraft would have by reaching the goal point via these paths while complying with the vertical flight profile imposed, and wherein the catalogued paths associated with forecastable values of altitude that are less than or equal to the goal point altitude given by the terrain elevation database and increased by a protection margin are excluded from the search for the shortest path.

2. The method as claimed in claim 1, wherein the distance estimation made by the distance transform operating by propagation over the image constituted from the elements of the terrain elevation database corresponding to the map is doubled up with an estimation of the forecastable altitude of the aircraft in line with the various points of the image by assuming that it follows the shortest path selected for the distance estimation and that it complies with the vertical flight profile imposed.

3. The method as claimed in claim 2, wherein the altitudes of the various points of the map are subtracted from the estimates of the forecastable altitudes of the aircraft at these points to obtain deviations with respect to the ground.

4. The method as claimed in claim 3, wherein the deviations with respect to the ground are displayed on the map as color strata.

5. The method as claimed in claim 1, wherein the propagation-based distance transform scans the pixels of the image constituted from the elements of the terrain elevation database corresponding to the map, in several successive passes according to different orders.

6. The method as claimed in claim 5, wherein the propagation-based distance transform scans the pixels of the image constituted from the elements of the terrain elevation database corresponding to the map, in several successive passes according to different orders and repeatedly until the distance estimates obtained stabilize.

7. The method as claimed in claim 5, wherein the propagation-based distance transform scans the pixels of the image constituted from the elements of the terrain elevation database corresponding to the map, in several successive passes according to different orders including lexicographic order, inverse lexicographic order, transposed lexicographic order and inverse transposed lexicographic order.

8. The method as claimed in claim 5, wherein the propagation-based distance transform scans the pixels of the image constituted from the elements of the terrain elevation database corresponding to the map, in a series of four passes that is repeated until stabilization of the distance estimates:
 a first pass performed row by row from top to bottom of the image, each row being traversed from left to right,
 a second pass performed row by row from bottom to top of the image, each row being traversed from right to left,
 a third pass performed column by column from left to right of the image, each column being traversed from top to bottom, and
 a fourth pass performed column by column from right to left of the image, each column being traversed from bottom to top.

9. The method as claimed in claim 5, wherein the propagation-based distance transform scans the pixels of the image constituted from the elements of the terrain elevation database corresponding to the map, in a series of eight passes that is repeated until stabilization of the distance estimates:
 a first pass performed row by row from top to bottom of the image, each row being traversed from left to right,
 a second pass performed row by row from bottom to top of the image, each row being traversed from right to left,
 a third pass performed column by column from left to right of the image, each column being traversed from top to bottom,
 a fourth pass performed column by column from right to left of the image, each column being traversed from bottom to top,
 a fifth pass performed row by row from top to bottom of the image, each row being traversed from right to left,
 a sixth pass performed row by row from bottom to top of the image, each row being traversed from left to right,
 a seventh pass performed column by column from right to left of the image, each column being traversed from top to bottom, and
 an eighth pass performed column by column from left to right of the image, each column being traversed from bottom to top.

10. The method as claimed in claim 5, wherein the propagation-based distance transform scans the pixels of the image constituted from the elements of the terrain elevation database belonging to the map, in several successive passes according to different orders some of which consist of a scan of the image by diagonals, from one edge to the other and, within a diagonal, from one end to the other.

* * * * *